(12) United States Patent
Arik et al.

(10) Patent No.: US 8,120,908 B2
(45) Date of Patent: Feb. 21, 2012

(54) THERMAL MANAGEMENT SYSTEM FOR EMBEDDED ENVIRONMENT AND METHOD FOR MAKING SAME

(75) Inventors: Mehmet Arik, Niskayuna, NY (US); Charles Franklin Wolfe, Albany, NY (US); Yogen Vishwas Utturkar, Latham, NY (US); Charles Erklin Seeley, Niskayuna, NY (US); David Shannon Slaton, Huntsville, AL (US); William Henry Lueckenbach, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 80 days.

(21) Appl. No.: 12/517,679

(22) PCT Filed: Oct. 26, 2007

(86) PCT No.: PCT/US2007/082642
§ 371 (c)(1),
(2), (4) Date: Nov. 23, 2009

(87) PCT Pub. No.: WO2008/073592
PCT Pub. Date: Jun. 19, 2008

(65) Prior Publication Data
US 2010/0067191 A1 Mar. 18, 2010

(51) Int. Cl.
*H05K 7/20* (2006.01)
*G06F 1/20* (2006.01)
(52) U.S. Cl. ............. 361/694; 361/679.47; 361/679.48; 361/679.54; 361/697; 361/704; 165/80.3; 165/185; 165/908; 239/102.2

(58) Field of Classification Search ........ 361/679.47–679.48, 679.54, 694–695, 361/697, 703–704, 709–710, 719; 165/80.2–80.3, 165/185, 908; 174/16.1, 16.3; 239/102.2
See application file for complete search history.

(56) References Cited

U.S. PATENT DOCUMENTS

| | | | |
|---|---|---|---|
| 4,519,751 A * | 5/1985 | Beckman et al. | 417/322 |
| 5,758,823 A | 6/1998 | Glezer et al. | |
| 5,894,990 A | 4/1999 | Glezer et al. | |
| 5,914,856 A * | 6/1999 | Morton et al. | 361/690 |
| 5,988,522 A | 11/1999 | Glezer et al. | |

(Continued)

FOREIGN PATENT DOCUMENTS
EP  1020911  7/2000
(Continued)

OTHER PUBLICATIONS

Mittal, R. and Rampinggoon, P. "On Virtual Aero-Shaping Effect of Synthetic Jets," Phys.Fluids, 14 (4) pp. 1533-1536, Apr. 2002.
(Continued)

*Primary Examiner* — Robert J Hoffberg
(74) *Attorney, Agent, or Firm* — Ziolkowski Patent Solutions Group, SC; Jean K. Testa

(57) ABSTRACT

A thermal management system for an embedded environment is described. The thermal management system includes a pleumo-jet that has at least one wall defining a chamber, at least one piezoelectric device on the at least one wall, and a compliant material within the at least one wall and encompassing the chamber. The compliant material has at least one opening providing fluid communication between said chamber and the embedded environment. A cooling system is also described. A method for making a pleumo-jet is also described.

26 Claims, 5 Drawing Sheets

U.S. PATENT DOCUMENTS

| | | | |
|---|---|---|---|
| 6,056,204 | A | 5/2000 | Glezer et al. |
| 6,123,145 | A * | 9/2000 | Glezer et al. ............ 165/104.33 |
| 6,232,680 | B1 | 5/2001 | Bae et al. |
| 6,471,477 | B2 | 10/2002 | Hassan et al. |
| 6,575,715 | B1 | 6/2003 | Rastegar |
| 6,588,497 | B1 | 7/2003 | Glezer et al. |
| 6,722,581 | B2 | 4/2004 | Saddoughi |
| 6,801,430 | B1 | 10/2004 | Pokharna |
| 6,869,275 | B2 | 3/2005 | Dante et al. |
| 6,937,472 | B2 * | 8/2005 | Pokhama ..................... 361/700 |
| 7,023,697 | B2 | 4/2006 | Pokhama et al. |
| 7,061,161 | B2 | 6/2006 | Scher et al. |
| 7,248,475 | B2 * | 7/2007 | Paydar et al. ................ 361/695 |
| 7,252,140 | B2 * | 8/2007 | Glezer et al. ................ 165/80.3 |
| 7,282,837 | B2 * | 10/2007 | Scher et al. .................. 310/328 |
| 7,498,718 | B2 * | 3/2009 | Vogeley ........................ 310/324 |
| 7,607,470 | B2 * | 10/2009 | Glezer et al. ................ 165/121 |
| 7,641,468 | B2 * | 1/2010 | Wu et al. .................... 425/405.1 |
| 7,688,583 | B1 * | 3/2010 | Arik et al. .................... 361/694 |
| 7,793,709 | B2 * | 9/2010 | Mukasa et al. ............... 165/121 |
| 7,861,767 | B2 * | 1/2011 | Mukasa ....................... 165/80.3 |
| 2003/0043531 | A1 | 3/2003 | Trautman et al. |
| 2004/0018103 | A1 | 1/2004 | Rastegar |
| 2004/0253130 | A1 | 12/2004 | Sauciuc et al. |
| 2005/0121171 | A1 * | 6/2005 | Mukasa et al. ............... 165/80.3 |
| 2006/0043626 | A1 * | 3/2006 | Wu et al. ....................... 264/101 |
| 2006/0196638 | A1 | 9/2006 | Glezer et al. |
| 2006/0232166 | A1 * | 10/2006 | Vogeley ........................ 310/324 |
| 2006/0237171 | A1 | 10/2006 | Mukasa et al. |
| 2006/0239844 | A1 | 10/2006 | Nakayama |
| 2006/0268534 | A1 * | 11/2006 | Paydar et al. ................. 361/814 |
| 2006/0281398 | A1 * | 12/2006 | Yokomizo et al. ........... 454/184 |
| 2007/0119575 | A1 * | 5/2007 | Glezer et al. ............ 165/104.33 |
| 2008/0137289 | A1 * | 6/2008 | Arik et al. .................... 361/689 |
| 2010/0051242 | A1 * | 3/2010 | Arik et al. ................ 165/104.33 |
| 2010/0054973 | A1 * | 3/2010 | Arik et al. .................... 417/437 |
| 2011/0139893 | A1 * | 6/2011 | Wetzel et al. .............. 239/102.2 |

FOREIGN PATENT DOCUMENTS

| | | | |
|---|---|---|---|
| JP | 02073657 A * | 3/1990 | |
| JP | 03116961 | 5/1991 | |
| JP | 2000 286579 | 10/2000 | |

OTHER PUBLICATIONS

Smith, D., Amitay, M., Kibens, V., Parekh, D., and Glezer, A., Modification of Lifting Body Aerodynamics Using Synthetic Jet Actuators, AIAA Paper 98-0209, pp. 1-12, Copyrighted 1997 and 1998.

Crook, A., Sadri, A.M. and Wood, N.J. "The Development and Implementation of Synthetic Jets for the Control of Separated Flow," 1999 American Institute of Aeronautics & Astronautics, pp. 1-11, Jun. 28-Jul. 1, 1999.

Mittal, R., Rampunggoon, P., "Interaction of a Synthetic Jet with a flat Plate Boundary Layer,", American Institute of Aeronautics & Astronautics, 2001, pp. 1-11, Jun. 11-14, 2001.

Smith, B.L., Glezer, A., "Jet Vectoring Using Synthetics Jets," J. Fluid Mech., 2002, vol. 458, pp. 1-17, p. 18 (incomplete).

Rathnasingham, R., Breuer, K.S., "System Identification and Control of a Turbulent Boundary Layer," Phys. Fluids 9 (7), Jul. 1997, pp. 1867-1869.

Lee, C.Y., Goldstein, D.B., "DNS of Microjets for Turbulent Boundary Layer Control," 2001 American Institute of Aeronautics & Astronautics, pp. 1-13, Jan. 8-11, 2001.

Mahalingham, R., Rumigny, N. and Glezer, A., "Thermal Management Using Synthetic Jet Ejectors," IEEE Transactions of Components and Packaging Technologies, vol. 27, No. 3, Sep. 2004, pp. 439-444.

Mahalingam, R. Glezer, A., "Design and Thermal Characteristics of a Synthetic Jet Ejector Heat Sink," Transactions of the ASME, vol. 127, Jun. 2005, pp. 172-177.

Holman, R., Utturkar, Y., "Formation Criterion for Synthetic Jets," AIAA Journal, vol. 43 No. 10, Oct. 2005, pp. 2110-2116.

Li, Shuo, "A Numerical Study of Micro Synthetic Jet and Its Applications in Thermal Management," (Thesis), Dec. 2005, pp. 1-251.

Erbas, N., Koklu, M. Baysal, O., "Synthetic Jets for Thermal Management of Microelectronic Chips," Proceedings of IMECE2005, Nov. 5-11, 2005, pp. 273-277.

Timchenko, V., Reizes, J., Leonard E., "A Numerical Study of Enhanced Micro-Channel Cooling Using a Synthetic Jet Actuator," 15th Australasian Fluid Mechanics Conf., Dec. 2004 pp. 1-4, Dec. 13-14, 2004.

Utturkar, Y., ittal, R., Rampunggoon, P., Cattafesta, L. "Sensitivity of Synthetic Jets to the Design of the Jet Cavity," 2002 American Institute of Aeronautics and Astronautics, pp. 1-8, Jan. 14-17, 2002.

Gallas, Q., Holman, R., Raju, R. Mittal, R., "Low Dimensional Modeling of Zero-Net Mass-Flux Actuators," 2nd. AIAA Flow Control Conference, Jun. 28-Jul. 1, 2004, pp. 1-12.

Raju, R., Mittal, R., Gallas, Q., Cattafesta, L., "Scaling of Vorticity Flux and Entrance Length Effects in Zero-Net Mass Flux Devices," 35th AIAA Fluid Dynamics Conference and Exhibit, Jun. 6-9, 2005, pp. 1-13.

Garg, J., Arik, M., Weaver, S., Saddoughi S., "Meso Scale Pulsating Jets for Electronics Cooling," Journal of Electronic Packaging, Dec. 2005, pp. 503-511.

Yassour. Y., Stricker, J., Wolfshtein, M. "Heat Transfer From a Small Pulsating Jet," Heat Transfer: Proceedings of the Eighth Int. Conf., San Francisco, Aug. 17-22, vol. 3, pp. 1183-1186, Date 1986.

Utturkar, Y., Arik, M., Gursoy, M. "An Experimental and Computational Sensitivity Analysis of Synthetic Jet Cooling Performance," ASME Int. Mechanical Eng. Congress and Exposition, Chicago, Ill., IMECE2006-13743, pp. 1-12, Nov. 5-10, 2006.

* cited by examiner

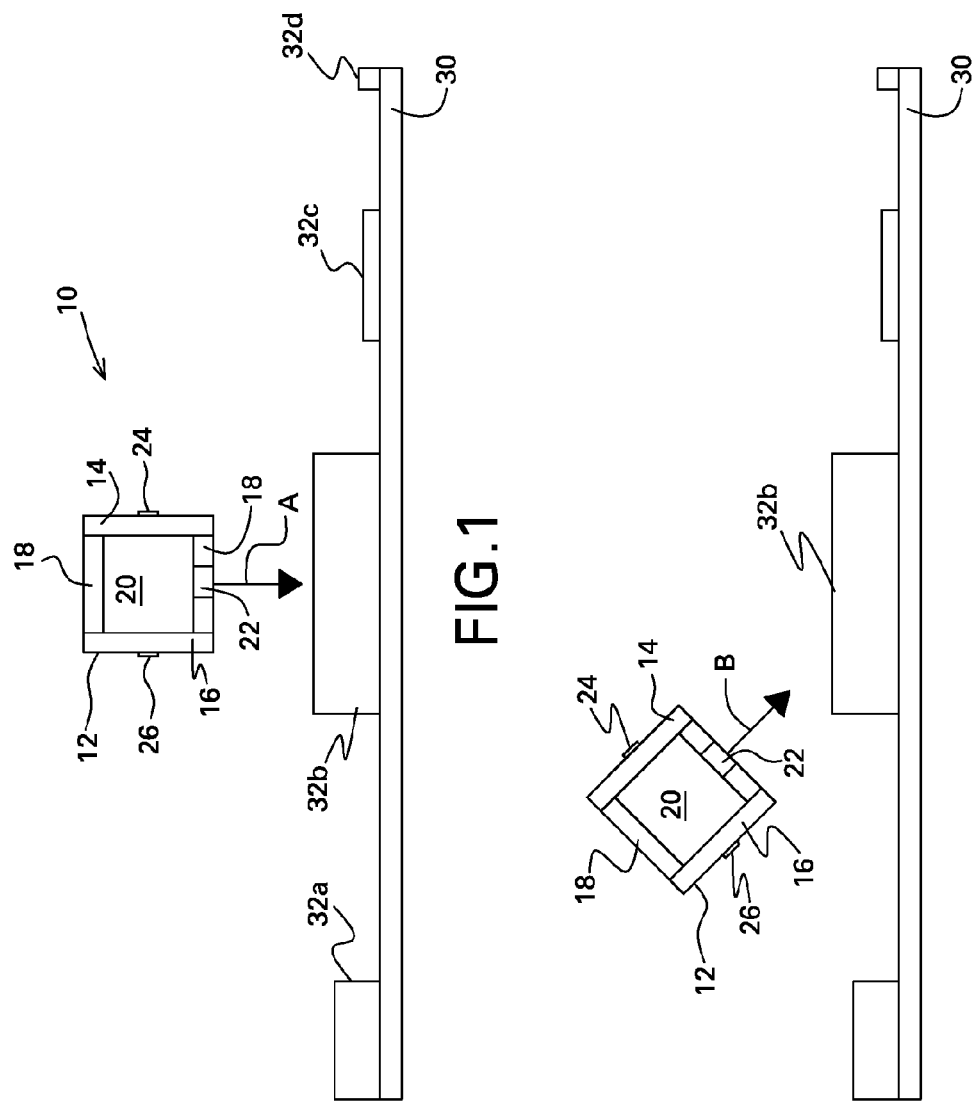

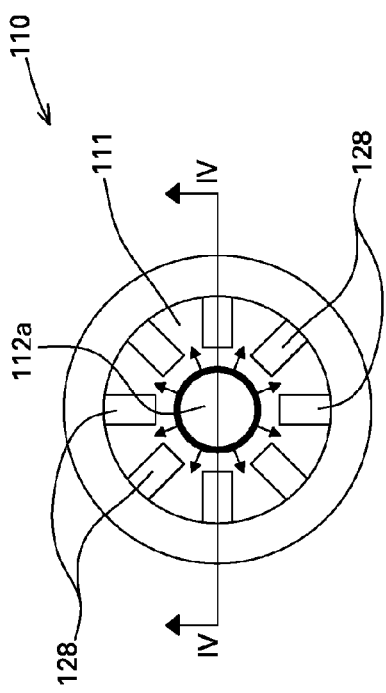
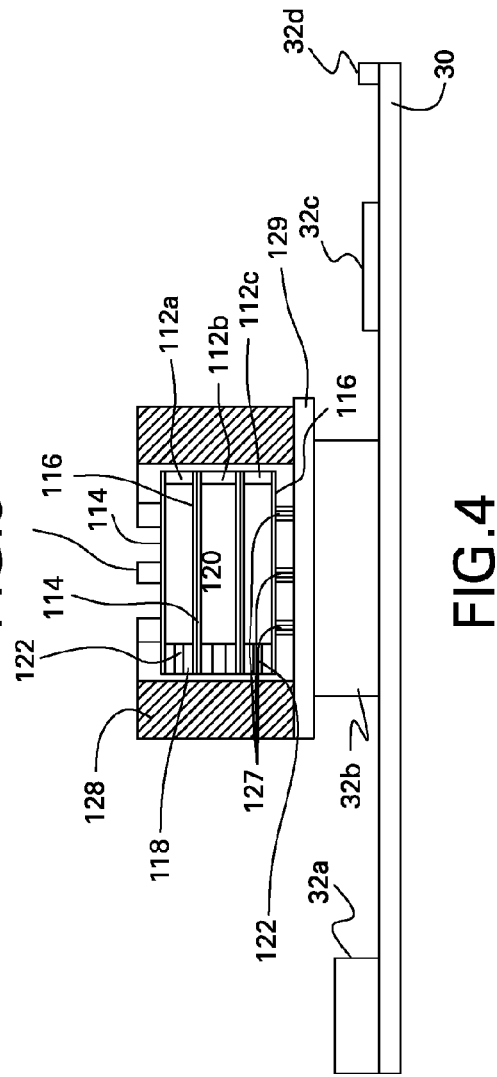
FIG.3
FIG.4

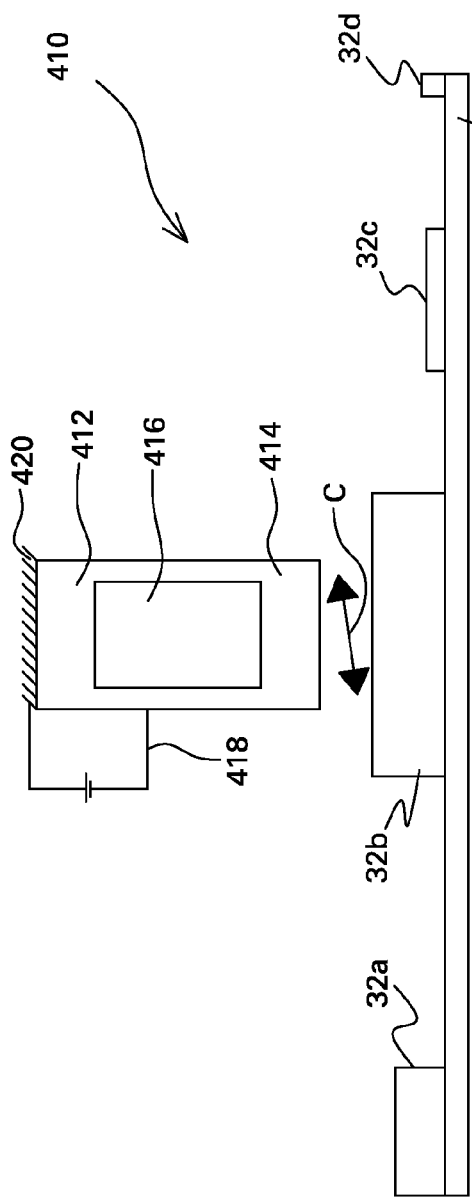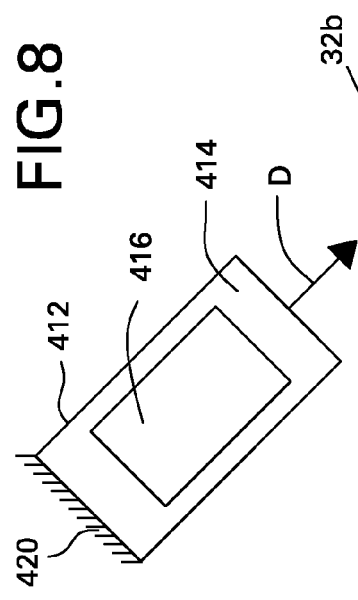
FIG.8
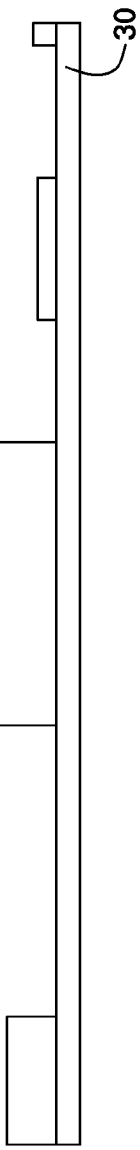
FIG.9

THERMAL MANAGEMENT SYSTEM FOR EMBEDDED ENVIRONMENT AND METHOD FOR MAKING SAME

BACKGROUND

The invention relates generally to thermal management systems, and more particularly to thermal management systems for use in embedded environments.

Environments having embedded electronic systems, hereinafter embedded environments or heated environments, offer challenges for thermal management. Such systems produce waste heat as a part of their normal operation, heat that must be removed for proper performance and reliability of the embedded electronics. The design of thermal management systems to provide cooling for embedded electronics is a formidable challenge due to space limitations. Examples of embedded electronic systems include single board computers, programmable logic controllers (PLCs), operator interface computers, laptop computers, cell phones, personal digital assistants (PDAs), personal pocket computers, and other small electronic devices, there is a limited amount of available space for thermal management systems. It has been known to use passive cooled heat sinks or forced air-cooling as thermal management systems to assist in the removal of heat from electronic components. Further, it has been known that conducting the heat generated by electronic components to a printed circuit board, on which they are mounted, thereby providing a migration of the heat from a smaller area to a larger area.

SUMMARY

The invention includes embodiments that relate to a thermal management system for a heated environment that includes a pleumo-jet. The pleumo-jet includes at least one wall defining a chamber, at least one active material on the at least one wall, and a compliant material within the at least one wall and encompassing the chamber. The compliant material has at least one opening facilitating fluid communication between the chamber and the heated environment.

The invention includes embodiments that relate to a pleumo-jet that includes a first flexible structure, a second flexible structure, at least one active material on at least one of the first and second flexible structures, and a compliant material positioned between the first and second flexible structures and defining a chamber. The compliant material includes at least one orifice for facilitating fluid communication between the chamber and an ambient environment.

The invention includes embodiments that relate to a cooling system for a heated environment. The cooling system includes a substrate having one free end and one anchored end, at least one piezoelectric device positioned on the substrate, and an electrical circuit to provide an electrical current to the at least one piezoelectric device.

The invention includes embodiments that relate to a method for making a pleumo-jet. The method includes providing a pair of flexible structures, at least one of the structures having an attached active material, attaching a compliant material between the pair of flexible structures, the elastomeric material having at least one orifice, and adding electrical contacts to the pair of flexible structures.

These and other advantages and features will be more readily understood from the following detailed description of preferred embodiments of the invention that is provided in connection with the accompanying drawings.

BRIEF DESCRIPTION OF THE DRAWINGS

FIG. 1 is a cross-sectional side view of a thermal management system utilizing a pleumo-jet constructed in accordance with an embodiment of the invention.

FIG. 2 is a cross-sectional side view showing the thermal management system of FIG. 1 with the pleumo-jet in a different position.

FIG. 3 is a top view of a thermal management system constructed in accordance with an embodiment of the invention.

FIG. 4 is a cross-sectional side view of the thermal management system of FIG. 3 taken along line IV-IV.

FIG. 8 is a schematic view a thermal management system utilizing a piezoelectrically driven flexible cooling apparatus constructed in accordance with an embodiment of the invention.

FIG. 9 is a schematic view showing the thermal management system of FIG. 8 with the piezoelectrically driven flexible cooling apparatus in a different position.

DETAILED DESCRIPTION

Figure 5:
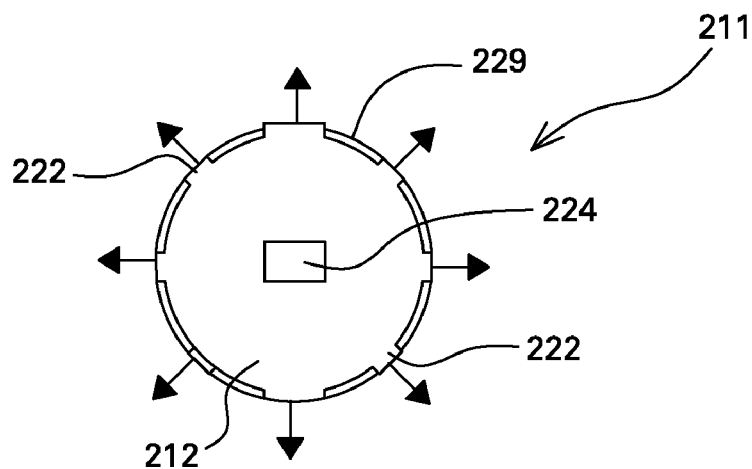
FIG. 5 is a top view of a pleumo-jet constructed in accordance with an embodiment of the invention.

Referring to FIGS. 1 and 2, there is shown a thermal management system 10 that includes a pleumo-jet 12 illustrated in cross-section and placed in proximity to a printed circuit board assembly (PCA) 30 having a plurality of electronic components to be cooled $32_{a\text{-}d}$. While a PCA 30 is depicted with reference to an embodiment of the invention, it should be appreciated that the thermal management system 10 may be utilized in any suitable embedded environment and its depiction with reference to the PCA 30 is merely for convenience in description. The PCA 30 may be used in heated environments in any number of small electronic devices, such as, for example, single board computers, programmable logic controllers (PLCs), laptop computers, cell phones, personal digital assistants (PDAs), personal pocket computers, to name a few. The pleumo-jet 12 is sized appropriately for its use, and generally is in the meso-scale or micro-scale.

The pleumo-jet 12 is positioned such that a pulsating fluid stream of ambient air can be generated from the apparatus 12 and directed at the electronic components to be cooled $32_{a\text{-}d}$. As shown, in FIG. 1, a fluid stream of ambient air, or other fluid, is directed along direction A toward the electronic component to be cooled $32_b$. Alternatively, the pleumo-jet 12 may be positioned to direct a fluid stream of ambient air along direction B toward the electronic component to be cooled $32_b$ (FIG. 2).

The pleumo-jet 12 includes a first structure or wall 14 and a second structure or wall 16. The walls 14, 16 are formed of a flexible material, such as, for example, metal, foil, plastic, or polymer composite material. A compliant material 18 is positioned between the pair of walls 14, 16, and the combination of the walls 14, 16 and the compliant material 18 define a chamber 20. At least one orifice 22 provides a channel between the chamber 20 and the environment outside the apparatus 12. Although a pair of opposing walls 14, 16 are depicted, it should be appreciated that instead of two walls, a single wall (wrapping around to form a cylinder) along with the compliant material 18 may form a pleumo-jet, such as the pleumo-jet 12.

Positioned on at least one of the walls 14, 16 is an active material, such as, for example, a piezoelectric material. As shown, active materials 24 and 26 are positioned, respectively, on walls 14 and 16. A suitable active material is one which is capable of creating stress resulting from an electrical stimulus. Examples of suitable active material include piezoelectric material, magnetostrictive material (magnetic fields from coils attract/oppose one another), shape-memory alloy, and motor imbalance (motor with a mass imbalance creates oscillatory motion). Within the subset of piezoelectric materials, suitable active materials include bimorph piezoelectric configurations, where two piezo layers are energized out of phase to produce bending; thunder configurations, where one piezo layer is disposed on a pre-stressed stainless steel shim; buzzer element configurations, where one piezo layer is disposed on a brass shim; and macro-fiber composite (MFC) configurations, where a piezo fiber composite on a flexible circuit is bonded to a shim.

The active material 24, 26 may incorporate a ceramic material. Electrical circuitry (schematically depicted in FIG. 8) is attached to the pleumo-jet 12 to provide an electrical current to one or both of the active material 24, 26. The current may be provided as a sine wave, a square wave, a triangular wave, or any other suitable waveform, and it should be appreciated that the current is not to be limited to any specific wave form. Specifically, it has been found that currents having lower harmonics, such as, for example, a sine wave may be used to provide a quieter pleumo-jet 12.

FIGS. 3 and 4 illustrate a thermal management system 110 in accordance with another embodiment of the invention. The thermal management system 110 includes a pleumo-jet system 111, which has a plurality of pleumo-jets in a stacked arrangement. As shown, the pleumo-jet system 111 includes pleumo-jets 112$_a$, 112$_b$, and 112$_c$ in a stacked arrangement. The pleumo-jet 112$_c$, is positioned over a base 129 and supported in that location with one or more supports 127. The pleumo-jets 112$_a$, 112$_b$, and 112$_c$ have a similar construction to the pleumo-jet 12 (FIGS. 1, 2), with the optional exception of the orifices. Specifically, each of the pleumo-jets 112$_a$, 112$_b$, and 112$_c$ includes flexible walls 114, 116 and a compliant material 118 defining a chamber 120, and each of the flexible walls has one or more active materials (not shown). Supports between the pleumo-jets 112$_a$, 112$_b$, and 112$_c$ are necessary to provide sufficient room to accommodate the active materials on one or both flexible walls of each pleumo-jet.

Each pleumo-jet 112$_a$, 112$_b$, and 112$_c$ may include a single orifice 122 extending from the chambers 120 through the compliant material. The pleumo-jet system 111 may be arranged such that each of the single orifices 122 of each pleumo-jet 112$_a$, 112$_b$, and 112$_c$ is positioned in the same direction (FIG. 4). Alternatively, each of the single orifices 122 may be positioned to direct ambient air in a different direction than the other single orifices 122 (FIG. 3). For any two adjacent orifices 122, the separation between the orifices 122 may be in a range between just above zero degrees)(0°) to less than ninety degrees)(90°). In one embodiment, adjacent orifices 122 may be separated by a range of about 5° to about 45°.

The pleumo-jets 112$_a$, 112$_b$, and 112$_c$ are surrounded by fins 128, which are supported on the base 129. The fins 128 assist in increasing the surface area for heat transfer for cooling the electronic components 32$_{a-d}$. As with the previously described pleumo-jet 12, the pleumo-jets 112$_a$, 112$_b$, and 112$_c$ utilize active material, for example a piezoelectric material (not shown), to form streams of ambient air. Briefly, electrical current from electrical circuitry (shown in FIG. 8) is received by the active material, and transformed into mechanical energy. The electrical current can take the form of a sine wave, a square wave, a triangular wave, or any other suitable wave form. The voltage level for the electrical current may be between 1 and 150 volts but is not so limited. The frequency of the current may be between 2 and 300 hertz for embodiments requiring reduced noise, and between 300 hertz and 15 kilohertz for embodiments that do not require reduced noise levels.

The active material creates stress on the flexible walls, causing them to flex inwardly, resulting in a chamber volume change and an influx of ambient air into the chambers 120, and then outwardly, thereby ejecting the ambient air from the chambers 120 via the orifices 122.

Another alternative embodiment of a pleumo-jet system is illustrated in FIG. 5. Specifically, a pleumo-jet system 211 is illustrated as including a base 229 supporting a pleumo-jet 212. The pleumo-jet 212 has a plurality of orifices 222, each extending outwardly in different radial directions. An active material 224 is shown on a surface of a flexible wall of the pleumo-jet 212. For any two adjacent orifices 222, the separation between the orifices 222 may be in a range between just above 0° to less than 90°. In one embodiment, adjacent orifices 222 may be separated by a range of about 5° to about 45°.

Figure 6:
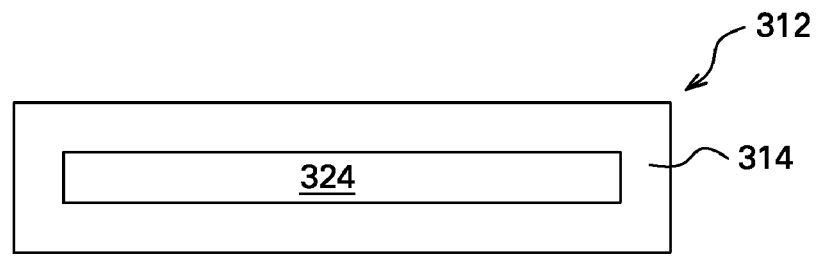
FIG. 6 is a top view of a pleumo-jet constructed in accordance with an embodiment of the invention.
Figure 7:
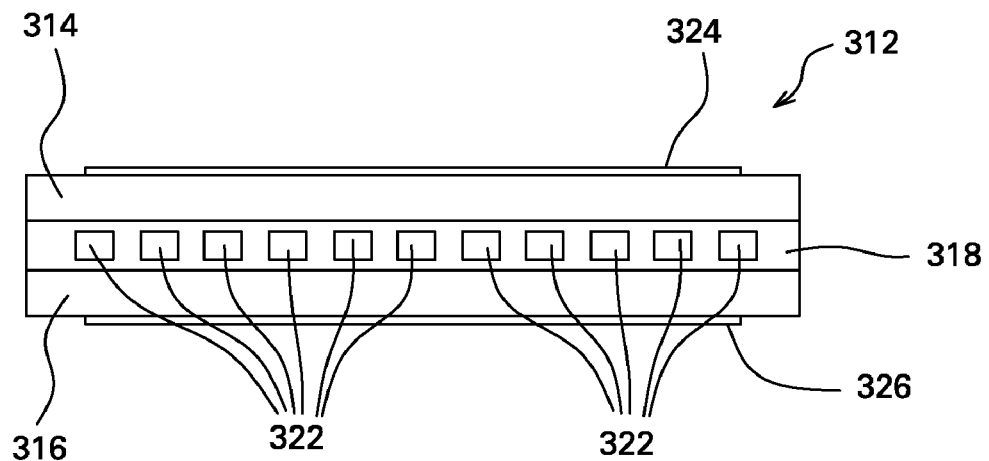
FIG. 7 is a side view of the pleumo-jet of FIG. 6.

FIGS. 6 and 7 illustrate a pleumo-jet 312. The pleumo-jet 312 includes a first flexible wall or structure 314, a second flexible wall or structure 316, and a compliant material 318 positioned between the flexible walls 314, 316. The walls 314 and 316 are rectangular in shape and, together with the compliant material 318, form a chamber (not shown). Orifices 322 extend out through the compliant material 318 from the chamber to the ambient environment. An active material 324 is positioned on the wall 314, and optionally an active material 326 may be positioned on the wall 316. The active material can be activated with an electric current provided by electrical circuitry (not shown) to create stress on the wall(s) 314 (and 316) to allow for the ingestion of ambient air into the chamber and the expulsion of the ambient air from the chamber to the ambient, heated environment.

FIGS. 8 and 9 illustrate another embodiment of a thermal management system. A thermal management system 410 is illustrated as including a piezoelectric fan apparatus 412 in working relationship with a PCA 30 containing electronic components to be cooled 32$_{a-d}$. The piezo fan apparatus 412 includes one free end and one end fixed to a support member 420. The piezo fan apparatus includes a substrate 414 and an active material 416. The active material 416 may utilize, for example, a piezoceramic material.

An electrical circuit 418 is connected to the piezo fan apparatus 412. Running an electrical current through the piezo fan apparatus 412 sends an electrical charge through the active material 416. The active material 416 transforms the electrical energy into mechanical energy by creating a stress on the substrate 414, causing it to rotate about the fixed end. This creates a current of ambient air to travel in a direction C (FIG. 8) or in a direction D (FIG. 9), depending upon the positioning of the piezo fan apparatus 412 relative to the electronic components to be cooled 32$_{a-d}$.

Figure 10:
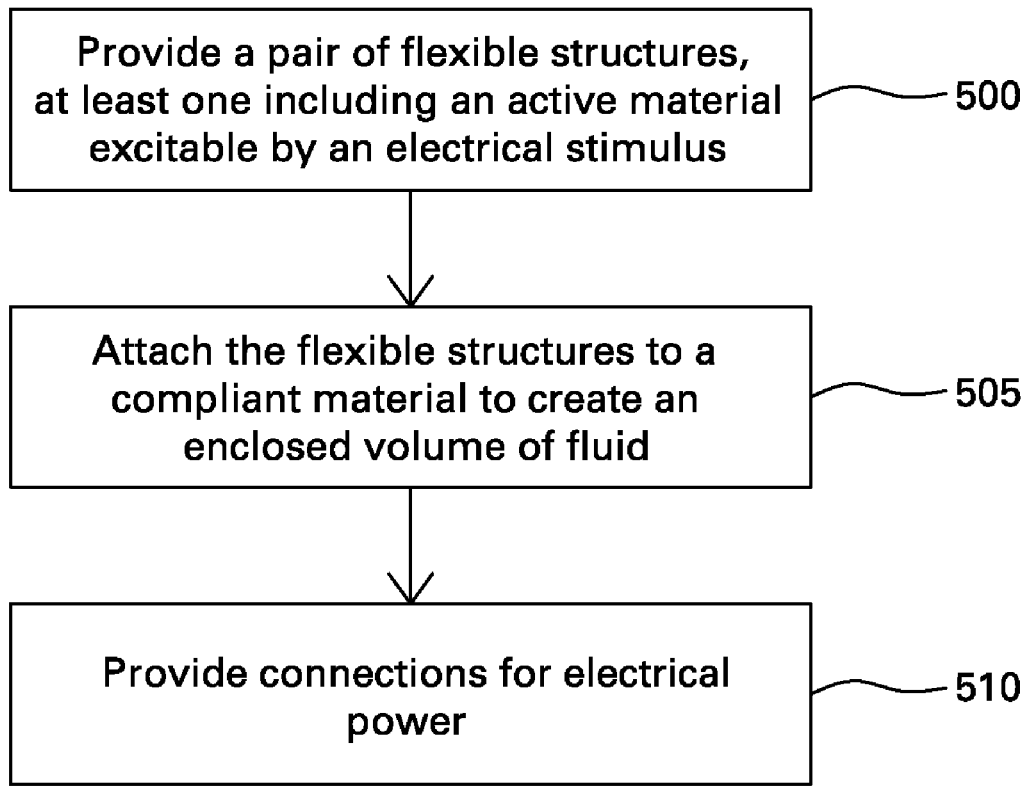
FIG. 10 illustrates process steps for forming a pleumo-jet in accordance with an embodiment of the invention.

Next, and with specific reference to FIG. 10, will be discussed a process for forming a pleumo-jet in accordance with an embodiment of the invention. At Step 500, a pair of flexible structures is provided. The flexible structures may be metallic or they may be non-metallic, such as plastic or polymer composite material. Examples of the flexible structures include flexible walls 14, 16 (FIGS. 1, 2) and flexible walls 314, 316 (FIGS. 6, 7). One or both of the flexible structures require an active material that is excitable by an electrical stimulus to be affixed thereon. Suitable examples of active material include material 24, 26 (FIGS. 1, 2) and material 324, 326 (FIGS. 6, 7).

At Step 505, a compliant material is attached between the flexible structures. The compliant material may be compliant material 18 (FIGS. 1, 2) or compliant material 318 (FIGS. 6, 7). The compliant material is to be provided in such a form as to define a chamber between the flexible structures. One process for providing the compliant material is to dispense the compliant material in a liquid or semi-liquid form onto one of the flexible structures, placing the other conductive structure on the compliant material, and allowing the compliant material to dry. A liquid silicone-based material may be suitable for such a process. Another process for providing the compliant material is to cut the compliant material from a pre-made sheet of compliant material, and bonding the pre-made sheet of cut compliant material to the flexible structures. A pre-made silicone-based sheet of material may be suitable for this process.

At Step 510, electrical contacts are provided to the flexible structures. Electrical circuitry will be attached to the electrical contacts.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A thermal management system for a heated environment, comprising:
    a pleumo-jet, comprising:
        a first wall;
        a second wall;
        an at least one active material on at least one of said first and second walls; and
        a spacer element formed of a compliant material and positioned between said first and second walls so as to be sandwiched therebetween, the spacer element configured to space the first wall apart from the second wall such that the spacer element together with the first and second walls define and encompass a chamber, said spacer element having at least one opening facilitating fluid communication between said chamber and the heated environment.

2. The thermal management system of claim 1, wherein said compliant material comprises an elastomeric material.

3. The thermal management system of claim 1, comprising an electrical circuit to provide an electrical current to said pleumo-jet.

4. The thermal management system of claim 3, wherein said electrical current comprises a sine wave.

5. The thermal management system of claim 1, wherein the heated environment includes single board computers, programmable logic controllers (PLCs), operator interface computers, laptop computers, cell phones, personal digital assistants (PDAs), and personal pocket computers.

6. The thermal management system of claim 1, wherein the heated environment comprises at least one heated body.

7. The thermal management system of claim 6, wherein said at least one opening is positioned to eject an ambient fluid directly on said at least one heated body.

8. The thermal management system of claim 7, wherein said at least one opening is at an angle transverse to an upper surface of the at least one heated body.

9. The thermal management system of claim 1, wherein said at least one opening comprises a plurality of openings facilitating fluid communication between said chamber and the heated environment.

10. The thermal management system of claim 1, wherein each of said first and second walls is formed of a flexible material configured to flex responsive to activation of said at least one active material, and wherein each of said first and second walls is formed from a single, continuous piece of flexible material.

11. The thermal management system of claim 1, wherein each of said first and second walls has a rectangular profile.

12. The thermal management system of claim 1, comprising:
    a base upon which said pleumo-jet is positioned; and
    a plurality of fins surrounding said pleumo-jet.

13. The thermal management system of claim 12, further comprising a plurality of additional pleumo-jets positioned on said pleumo-jet and said base in a stacked arrangement; and
    wherein each of said plurality of additional pleumo-jets comprises:
        an additional first wall;
        an additional second;
        an additional active material on at least one of said additional first and second walls; and
        an additional spacer element formed of the compliant material positioned between said additional first and second walls so as to be sandwiched therebetween, the spacer element configured to space the additional first wall apart from second wall such that the spacer element together with the additional first and second walls define and encompass an additional chamber, said additional spacer element having at least one additional opening facilitating fluid communication between said additional chamber and the heated environment.

14. The thermal management system of claim 1, wherein the at least one active material is positioned on each of said first and second walls.

15. A pleumo-jet, comprising:
    a first flexible wall;
    a second flexible wall spaced apart from the first flexible wall;
    an at least one active material positioned on at least one of said first and second flexible walls; and
    a compliant material connecting said first and second flexible walls and being formed along a perimeter of the first and second flexible walls so as to form a chamber along with the first and second walls, wherein said compliant material comprises at least one orifice for facilitating fluid communication between said chamber and an ambient environment.

16. The pleumo-jet of claim 15, comprising an electrical circuit to provide an electrical current to the at least one active material.

17. The pleumo-jet of claim 15, wherein said compliant material comprises an elastomeric material.

18. The pleumo-jet of claim 15, wherein said pleumo-jet is no larger than meso-scale sized.

19. The pleumo-jet of claim 15, wherein said at least one active material comprises a piezoceramic material.

20. The pleumo-jet of claim 15, wherein said at least one active material is positioned on both of said first and second flexible walls.

21. A method for making a pleumo-jet, comprising:
providing a pair of planar flexible walls, at least one of the planar flexible walls having an attached active material;
attaching a compliant material between the pair of planar flexible walls such that the compliant material is sandwiched between the pair of planar flexible walls, said compliant material having at least one orifice; and
adding electrical contacts to the pair of planar flexible walls.

22. The method of claim 21, wherein said providing comprises providing said attached active material for each of the pair of planar flexible walls.

23. The method of claim 21, wherein said attaching comprises attaching the compliant material having an elastomeric material between the pair of planar flexible walls.

24. The method of claim 21, wherein said attaching comprises:
dispensing the compliant material as a semi-liquid silicone-based material along a perimeter area of one of the planar flexible walls; and
placing another of the planar flexible wall in contact with the semi-liquid silicone-based material; and drying the semi-liquid silicone-based material.

25. The method of claim 21, wherein said attaching comprises:
forming the compliant material from a pre-made sheet of silicone-based material; and
bonding the compliant material to each of the pair of planar flexible walls.

26. The method of claim 21, wherein said pair of planar flexible walls comprises a pair of rectangular walls.

\* \* \* \* \*

UNITED STATES PATENT AND TRADEMARK OFFICE
CERTIFICATE OF CORRECTION

PATENT NO. : 8,120,908 B2  Page 1 of 1
APPLICATION NO. : 12/517679
DATED : February 21, 2012
INVENTOR(S) : Arik et al.

It is certified that error appears in the above-identified patent and that said Letters Patent is hereby corrected as shown below:

On the Title Page, add Item (30) Foreign Application Priority Data

Dec. 8, 2006   (US)............11/608,378

Signed and Sealed this
Eighteenth Day of June, 2013

Teresa Stanek Rea
*Acting Director of the United States Patent and Trademark Office*